United States Patent [19]
Huang

[11] Patent Number: 5,564,328
[45] Date of Patent: Oct. 15, 1996

[54] PRESSURE COOKING DEVICE

[76] Inventor: Chin-ming Huang, No. 61, Kaomei Rd., Chingshui Chen, Taichung Hsien, Taiwan

[21] Appl. No.: 590,850

[22] Filed: Jan. 24, 1996

[51] Int. Cl.⁶ .............................. A47J 27/00; A47J 27/08
[52] U.S. Cl. .................. 99/337; 99/403; 99/415; 99/418; 220/314; 220/316
[58] Field of Search .......................... 99/337, 330, 338, 99/403, 407, 410–418; 220/314, 316, 374, 203.07, 347; 219/440, 431, 494; 126/369, 381, 388

[56] References Cited

U.S. PATENT DOCUMENTS

| | | | |
|---|---|---|---|
| 3,314,416 | 4/1967 | Wagner | 126/369 |
| 3,816,703 | 6/1974 | Binks | 219/440 |
| 3,964,637 | 6/1976 | Luebke et al. | 220/314 |
| 3,976,218 | 8/1976 | Stoermer | 220/316 |
| 4,273,991 | 6/1981 | Barnhill | 99/330 X |
| 4,294,167 | 10/1981 | Beauvais et al. | 99/403 X |
| 4,672,179 | 6/1987 | Onishi et al. | 219/441 |
| 4,721,094 | 1/1988 | Nett | 126/369 |
| 4,798,939 | 1/1989 | Nett | 219/438 |
| 5,092,229 | 3/1992 | Chen | 99/337 |
| 5,355,777 | 10/1994 | Chen et al. | 99/340 |
| 5,402,712 | 4/1995 | King et al. | 99/415 X |
| 5,442,998 | 8/1995 | Niese | 99/337 |

*Primary Examiner*—Timothy F. Simone
*Attorney, Agent, or Firm*—Townsend and Townsend and Crew LLP

[57] ABSTRACT

A pressure cooking device includes a column securely disposed to a floor and a bowl is fixedly disposed to the column, an arm and a bar respectively disposed to the column, the arm having a cap disposed thereto and a threaded shaft threadedly engaged through the arm and engaged to the cap, the bowl having a pair of lugs, each lug extending diametrically opposite with each other and the arm further having a stirrup integrally formed thereto wherein a first tip, a second tip and an arcuate periphery extending therebetween to define a substantially arcuate recess, two extension portions extending separately from the first tip and the second tip such that the arm can be pivoted above the bowl and the cap is securely mounted to the bowl by rotating downward the threaded shaft, the bar having a lifting device disposed thereto so as to put a steamer or food into the bowl.

5 Claims, 3 Drawing Sheets

PRESSURE COOKING DEVICE

BACKGROUND OF THE INVENTION

1. Field of the Invention

The present invention relates to a pressure cooking device and more particularly, to a pressure cooking device having a column with a rotatable arm and a fixed bowl disposed thereto, the rotatable arm having a cap with a forcing means disposed thereto so as to be rotated to securely mount onto the bowl.

2. Brief Description of the Prior Art

A conventional pressure cooker is designed to cook food such as meat quickly, with a high pressure and a high temperature. The pressure cooker is composed of a cap and a bowl onto which the cap is securely mounted by a simple securing means so as to provide a high pressure and a high temperature within the pressure cooker. The high pressure is maintained in the pressure cooker by a sealing feature provided by the securing means such that the meat can be cooked effectively. However, the securing means of the cap has a simple structure which can only provide a limited function for providing a high pressure in the bowl, and thus prolongs the required cooking time and therefore involves consumption of much more gas or electricity.

The present invention intends to provide a pressure cooking device which has a column with a rotatable arm disposed thereto and a fixed bowl, a cap and a forcing means disposed to the rotatable arm so as to mount onto the bowl by rotating the arm and the forcing means provides a well sealed feature between the bowl and the cap such that the pressure cooking device can be operated under high pressure and high temperature.

SUMMARY OF THE INVENTION

The present invention provides a pressure cooking device which includes a column fixedly planted to a floor and a bowl which is fixedly disposed to the column, an arm and a bar are respectively disposed to the column, the arm having a cap disposed thereto and a threaded shaft threadedly extending through the arm and engaged to the cap. The bowl has a pair of lugs, each lug extending diametrically opposite with each other and the arm further has a stirrup integrally formed thereto wherein a first tip, a second tip and an arcuate periphery extending therebetween to define a substantially arcuate recess. Two extension portions extending separately from the first tip and the second tip such that the arm can be pivoted above the bowl and the cap is securely mounted to the bowl by rotating downward the threaded shaft. The bar has a lifting device disposed thereto so as to put a steamer or food into the bowl.

It is an object of the present invention to provide a pressure cooking device which has a pivotable arm disposed to a column to which a bowl is fixedly disposed, the arm having a cap disposed thereto and mechanically connected to a threaded shaft such that the cap is securely mounted to the bowl by rotating the threaded shaft downwardly.

It is another object of the present invention to provide a pressure cooking device which has a lifting means so as to dispose food or a steamer with heavy weight into the bowl.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
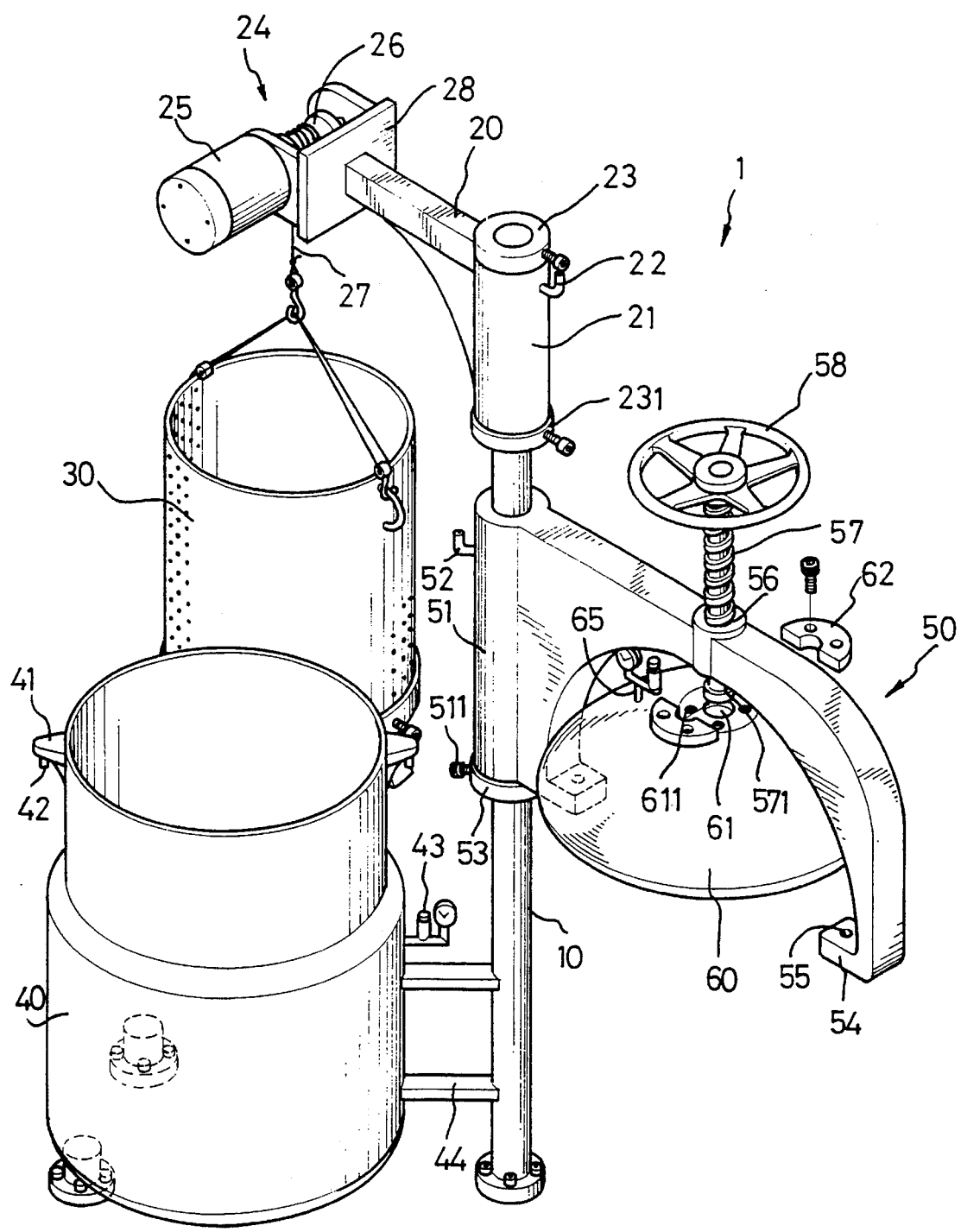
FIG. 1 is a perspective view of a pressure cooking device in accordance with the present invention.

Referring to the drawings and initially to FIG. 1, a pressure cooking device in accordance with the present invention generally includes a column 10 having a first end fixedly secured to a floor and a second end. A bowl 40 is fixedly connected to the column 10 by two plates 44 connected therebetween, the bowl 40 having a pair of lugs 41, each lug 41 extending from an outer periphery thereof and located diametrically opposite with each other, and having a stud 42 extending from an under side thereof.

An arm 50 is rotatably disposed to the column 10 by a first tube 51 which is formed integrally to a first end of the arm 50. The first tube 51 is slidably received on the column 10 and a first end thereof abuts a first collar 53 also slidably disposed to the column 10. A bolt 511 extends through the first collar 53 and urges against the column 10 so as to retain the arm 50 at a desired height. A first oil feeding tube 52 is disposed to the first tube so as to feed oil between the column 10 and the first tube 51. The arm 50 includes a stirrup portion integrally formed t a second end thereof wherein a first tip, a second tip and an arcuate periphery extending therebetween define a substantially semi-circular recess. An extension portion extends inwardly from each of the first tip and the second tip to face each other and each of the extension portions defines a cavity 55 in a top face thereof. A first hole 56 defined by a first threaded periphery extends through a mediate point in the stirrup and a threaded shaft 57 is threadedly extended through the first hole 56, the threaded shaft 57 having a first end with a wheel 58 perpendicularly disposed thereto and a second end with a cap 60 perpendicularly disposed thereto. The cap 60 and the bowl 40 each respectively have a safety valve 65, 43 disposed thereto so as to release pressure when needed.

A bar 20 is rotatably disposed to the second end of the column 10 to which a second tube 21 is integrally formed, the second tube 21 is received between an upper collar 23 and a lower collar 231, each of the upper collar 23 and the lower collar 231 has a bolt threadedly extended therethrough and in contact with the column 10 so as to position the second tube 21. A second oil feed tube 22 extends through the second tube 21 so as to feed lubricating oil between the second tube 21 and the column 10. A lifting means 24 is disposed to a distal end of the bar 20 and includes a frame 28 to which a mandrel 26 is rotatably disposed, the mandrel 26 connected to a motor 25 disposed to a side of the frame 28 so as to lift or lower a cable 27 mounted around the mandrel 26.

Figure 2:
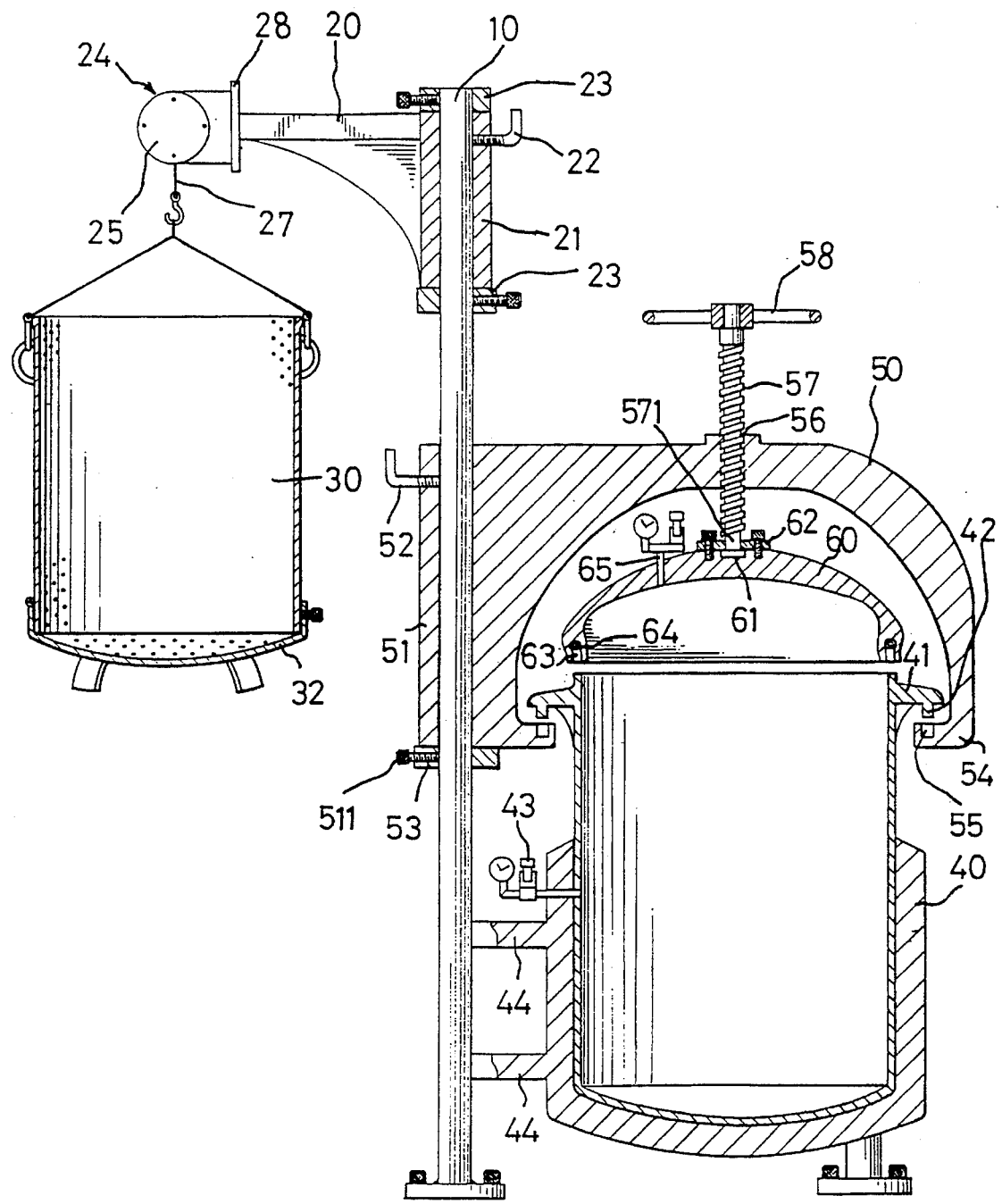
FIG. 2 is a side elevational view, partly in section, of an arm being pivoted above a bowl.
Figure 3:
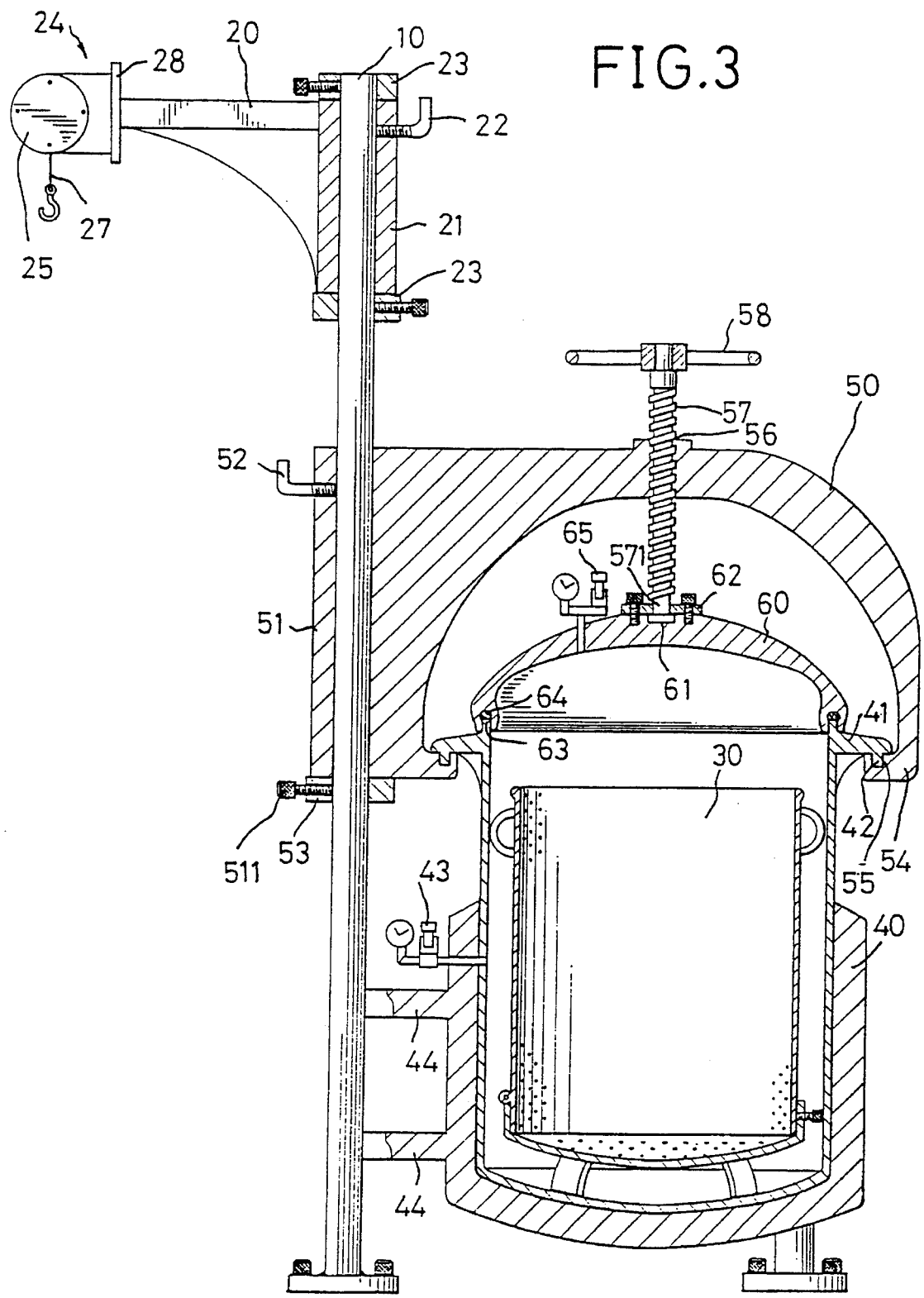
FIG. 3 is a side elevational view, partly in section, of a cap disposed to the arm to be securely mounted to the bowl by rotating a threaded shaft which is connected to the cap toward the bowl.

Referring to FIG. 2, when operating the device, a steamer 30 (or food) is hung on a hook disposed to the cable 27 and the bar 20 is pivoted above the bowl 40 to dispose the steamer 30 in the bowl 40, then the bar 20 is pivoted away from the bowl 40, the arm 50 is pivoted above the bowl 40 and the extension portions 54 are disposed to the under side of the lug 41 corresponding thereto. Referring to FIG. 3, the arm 50 is then moved to prevent the studs 42 to be extended into the cavities 55 of the extension portions 54, then the wheel 58 is rotated to lower the cap 60 to mount on the bowl 40. The cap 60 has a second groove 63 defined in an under periphery thereof and a seal 64 is disposed in the second groove 63 such that an upper periphery of the bowl 40 is received in the second groove 63. The second end of the threaded shaft 57 has a first groove 571 defined in a periphery thereof for two half elements 62 respectively received in the first groove 571. The cap 60 has a central recess 61 defined therein for receiving the second end of the threaded shaft 57 and a plurality of second holes 611 each defined by a second threaded periphery extending through in the cap 60 and located around the central recess 61 such that the two half elements 62 are fixedly engaged to the cap 60 by threading bolts through the half elements 62 and extending thereafter into the second holes 611. Accordingly, when rotating the wheel 58, the cap 60 is lowered by the threaded shaft 57 to securely engage to the bowl 40 and the studs 42 are securely received in the cavities 55. Thus, the device in accordance with the present invention can be used under high pressure and high temperature, and can cook a mass quantity of food which is disposed in the bowl 40 by using the lifting means.

The threaded shaft 57 used to lower the cap 60 can also replaced by a hydraulic assembly to provide a sufficient force to mount the cap 60 to the bowl 40.

Although the invention has been explained in relation to its preferred embodiment, it is to be understood that many other possible modifications and variations can be made without departing from the spirit and scope of the invention as hereinafter claimed.

What is claimed is:

1. A pressure cooking device comprising:

a column having a first end secured to a floor and a second end;

a bowl fixedly connected to the column by at least one plate connected therebetween, said bowl having a pair of lugs, each lug extending from an outer periphery thereof and located diametrically opposite with each other;

an arm rotatably disposed to said column by a first end thereof and having a stirrup portion formed at a second end thereof wherein a first tip, a second tip and an arcuate periphery extending therebetween, an extension portion extending from each of said first tip and said second tip, a hole defined by a threaded periphery extending through a middle portion of said arm and a threaded shaft threadedly engaged through said hole, said threaded shaft having a first end with a wheel perpendicularly disposed thereto and a second end with a cap perpendicularly disposed thereto, said extension portion being disposed to an under side of said lug corresponding thereto when said arm is rotated to a location above said bowl and said cap is mounted to said bowl by rotating said threaded shaft, and a bar rotatably disposed to said second end of said column and said bar having a lifting means disposed to a distal end thereof.

2. The pressure cooking device as claimed in claim 1 wherein each of said lugs of said bowl has a stud extending from said under side thereof and each of said extension portions has a cavity defined therein so as to receive said stud corresponding thereto when said extension portions are disposed beneath said lugs.

3. The pressure cooking device as claimed in claim 1 wherein at least one of said cap and said bowl has a safety valve disposed thereto.

4. The pressure cooking device as claimed in claim 1 wherein said second end of said threaded shaft has a first groove defined in a periphery thereof, said cap having a central recess defined therein for receiving said second end of said threaded shaft and a plurality of second holes defined by a second threaded periphery in said cap and located around said central recess, two half elements respectively received in said first groove and being fixedly to said cap by threading bolts through said half elements and engaged to said second holes.

5. The pressure cooking device as claimed in claim 1 wherein said cap has a second groove defined in an under periphery thereof and a seal is disposed in said second groove such that an upper periphery of said bowl is received in said second groove.

* * * * *